US011873955B1

(12) United States Patent
Yao

(10) Patent No.: US 11,873,955 B1
(45) Date of Patent: Jan. 16, 2024

(54) STRING LIGHT OF NOVEL STRUCTURE

(71) Applicant: ShenZhen Jin Chang Da Nonferrous Metals Co., Ltd., Shenzhen (CN)

(72) Inventor: Benyi Yao, Xinyang (CN)

(73) Assignee: ShenZhen Jin Chang Da Nonferrous Metals Co., Ltd., Shenzhen (CN)

( * ) Notice: Subject to any disclaimer, the term of this patent is extended or adjusted under 35 U.S.C. 154(b) by 0 days.

(21) Appl. No.: 18/201,820

(22) Filed: May 25, 2023

(30) Foreign Application Priority Data

Dec. 26, 2022 (CN) ......................... 202223476764.7

(51) Int. Cl.

| | |
|---|---|
| ***F21S 4/10*** | (2016.01) |
| ***F21V 17/10*** | (2006.01) |
| ***F21V 31/00*** | (2006.01) |
| ***F21V 23/00*** | (2015.01) |

(52) U.S. Cl.
CPC .............. *F21S 4/10* (2016.01); *F21V 17/101* (2013.01); *F21V 23/002* (2013.01); *F21V 31/005* (2013.01)

(58) Field of Classification Search
CPC ......... F21S 4/10; F21V 17/101; F21V 23/002
See application file for complete search history.

(56) References Cited

U.S. PATENT DOCUMENTS

| | | | | |
|---|---|---|---|---|
| 6,257,740 B1 * | 7/2001 | Gibboney, Jr. | F21V 23/04 439/654 |
| 11,499,700 B1 * | 11/2022 | Tsai | F21S 4/10 |
| 2003/0043579 A1 * | 3/2003 | Rong | H01R 33/09 362/237 |
| 2003/0198048 A1 * | 10/2003 | Frederick | F21S 4/10 362/249.01 |
| 2004/0201988 A1 * | 10/2004 | Allen | H05B 45/42 362/227 |
| 2004/0208002 A1 * | 10/2004 | Wu | F21S 4/10 362/653 |
| 2005/0117339 A1 * | 6/2005 | Pan | F21S 4/10 362/391 |
| 2006/0146578 A1 * | 7/2006 | Kuo | F21S 4/10 362/654 |
| 2015/0338036 A1 * | 11/2015 | Han | F21V 23/002 362/249.08 |

* cited by examiner

*Primary Examiner* — Bryon T Gyllstrom
(74) *Attorney, Agent, or Firm* — Georgi Korobanov

(57) ABSTRACT

The present disclosure relates to a string light of a novel structure. On a main wire, multiple string light bodies are connected in series, each string light body includes a lamp holder (1) and a lamp cap (8), a bulb is installed in the lamp cap (8), and the lamp cap (8) is connected to the lamp holder (1). One end of each of two hanging wires (3) is connected to the lamp holder (1) in a riveting mode through double riveting ports (2), and the other ends thereof are connected to positive and negative electrodes of the main wire, respectively. It is not only saves the cost and reduces the defective rate, but also is more solid and less likely to cause a fall-off problem compared with the traditional spot welding connection, reducing the problems of poor electrical conductivity and poor contact of a single lamp cap.

6 Claims, 3 Drawing Sheets

STRING LIGHT OF NOVEL STRUCTURE

CROSS-REFERENCE TO RELATED APPLICATIONS

This application claims the benefit and priority of Chinese patent application No. 202223476764.7, filed on Dec. 26, 2022, disclosure of which is hereby incorporated by reference in its entirety.

TECHNICAL FIELD

The present disclosure relates to the field of lamps, and in particular to a string light of a novel structure.

BACKGROUND

String lights, as small props to embellish the works of portraits, are easy to obtain and can also add creativity to make your works look more vivid, creating a warm and dreamy scene and warming up the picture.

However, the existing string lights have the following technical defects.

(1) The existing base and hanging wires are connected by welding, and due to the welding connection, the existing base and hanging wires are prone to fall off, resulting in the problems of poor electrical conductivity and poor contact of a single lamp cap.

(2) The existing string light is not provided with an internal frame on a lamp holder, so the lamp holder is easily extruded and deformed during injection moulding, resulting in a high percentage of defective lamp caps.

SUMMARY

The present disclosure designs a string light of a novel structure, which solves the technical problems: (1) The existing base and hanging wires are connected by welding, and due to the welding connection, the existing base and hanging wires are prone to fall off, resulting in the problems of poor electrical conductivity and poor contact of a single lamp cap. (2) The existing string light is not provided with an internal frame on a lamp holder, so the lamp holder is easily extruded and deformed during injection moulding, resulting in a high percentage of defective lamp caps.

In order to solve the above technical problems, the present disclosure uses the following solution.

Provided is a string light of a novel structure, on a main wire, a plurality of string light bodies being connected in series, each string light body including a lamp holder (1) and a lamp cap (8), a bulb being installed in the lamp cap (8), and the lamp cap (8) being connected to the lamp holder (1), where one end of each of two hanging wires (3) is connected to the lamp holder (1) in a riveting mode through double riveting ports (2), and the other ends of the two hanging wires (3) are connected to positive and negative electrodes of the main wire, respectively.

Preferably, the lamp holder (1) is sleeved with a round internal frame (5), the inner side face of the round internal frame (5) is provided with an embedded guide groove (6) for riveting terminals of the two hanging wires (3) and the lamp holder (1) to pass through, facilitating installing of the round internal frame (5), the lower end of the round internal frame (5) is connected to the lamp holder (1), and the upper end of the round internal frame (5) is connected to the lamp cap (8).

Preferably, the lower end of the round internal frame (5) is provided with a serrated notch (4), the serrated notch (4) facilitates the complete flow of PVC adhesives around the lamp holder (1) and the round internal frame (5) during injection moulding, so that the adhesives of the lamp holder (1), the round internal frame (5) and the lamp cap are completely in contact with each other and fused, improving the solidity of the lamp holder (1) and preventing the lamp holder from loosening or falling off during the process of screwing in the bulb.

Preferably, a waterproof ring (7) is disposed on the inner side of the opening portion of the lamp cap (8), the waterproof ring (7) is able to be in close press fit with a bulb shell of the bulb along with expansion of a lamp cap opening after the bulb is screwed in the lamp cap (8), preventing water drops from entering the inside of the lamp cap (8) and causing a short circuit, and improving the waterproof performance of the lamp cap.

Preferably, a step is provided inside the lamp cap (8), a step plane plays a role in preventing the bulb from being screwed in excessively, after the bulb is screwed in place, the edge of the step plane is in contact with the bulb shell of the bulb, and an outward elastic force is exerted on the bulb shell simultaneously, preventing the bulb from being further screwed in, and preventing the bulb from being damaged by being screwed in energetically.

Preferably, the lamp holder (1) is a conical lamp holder with a thread.

Preferably, after a single lamp cap is connected to the main wire, a hooked wire dividing frame (10) is placed between the two hanging wires (3), preventing contact points of the two hanging wires (3) from being connected and short circuited; and the exterior of the hooked wire dividing frame (10) is wrapped with a T-type connector (11).

Compared with the prior art, the string light of a novel structure has the following beneficial effects, (1) The present disclosure is more solid and less likely to cause a fall-off problem compared with the traditional spot welding connection method, reducing the problems of poor electrical conductivity and poor contact of the single lamp cap.

(2) By combining the two processes of penetration electrical connection and injection moulding, the present disclosure greatly improves the overall production efficiency and reduces the product cost at the same time, thus further improving the competitiveness of the product.

LIST OF REFERENTIAL NUMERALS

1—threaded lamp holder; 2—double riveting ports; 3—hanging wire; 4—serrated notch; 5—round internal frame; 6—embedded guide groove; 7—waterproof ring; 8—lamp cap; 9—connection terminal; 10—hooked wire dividing frame; 11—T-type connector.

DETAILED DESCRIPTION

Figure 2:
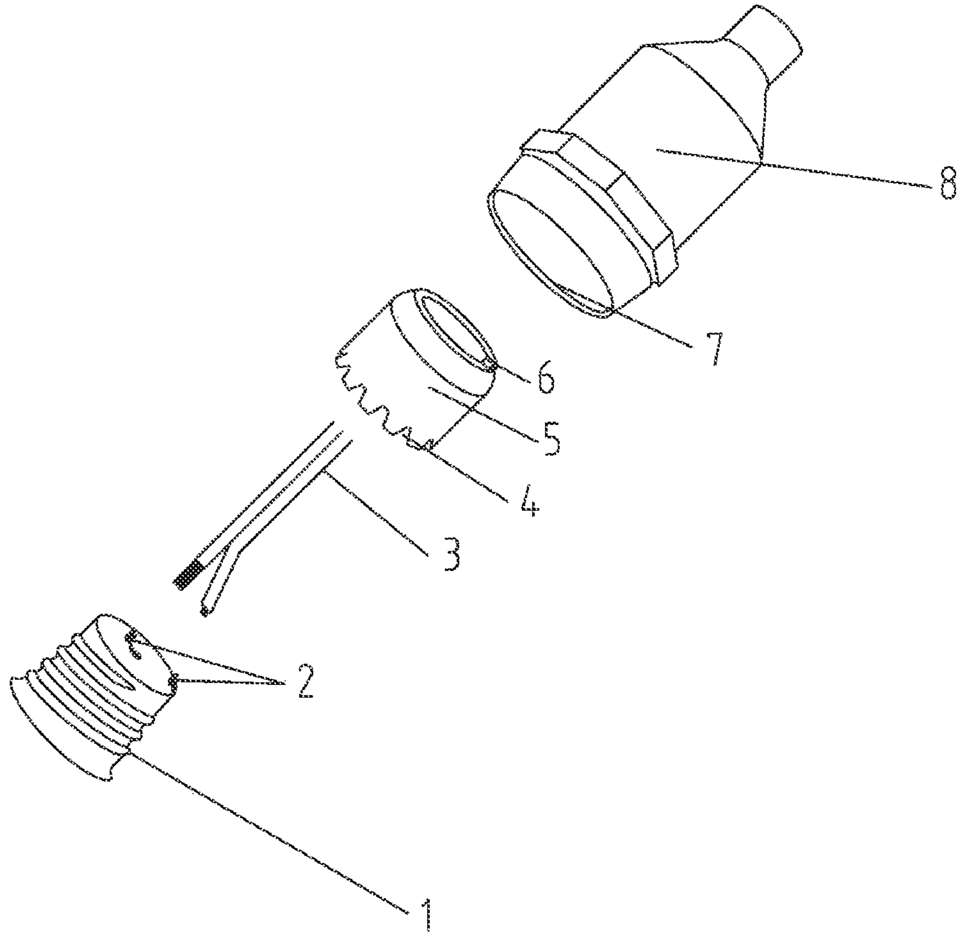
FIG. 2 is an exploded view of the string light of a novel structure according to the present disclosure.
Figure 3:
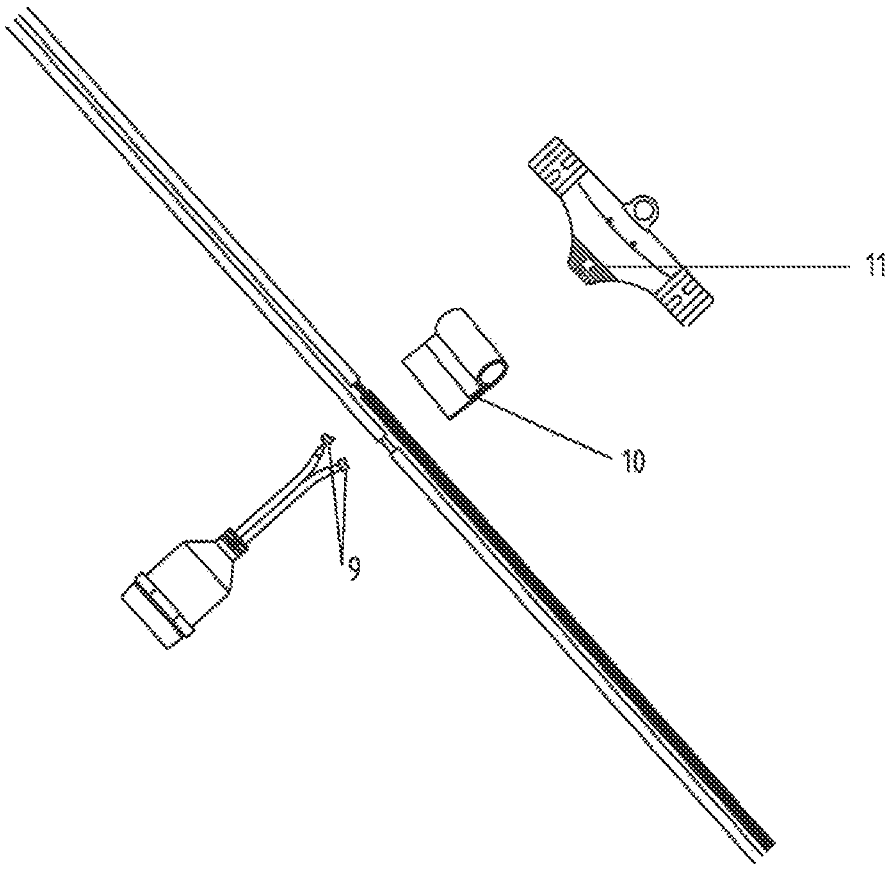
FIG. 3 is a schematic view of a connection of the string light of a novel structure and a main wire according to the present disclosure.

The present disclosure is further described below in conjunction with FIG. 1 to FIG. 3.

Figure 1:
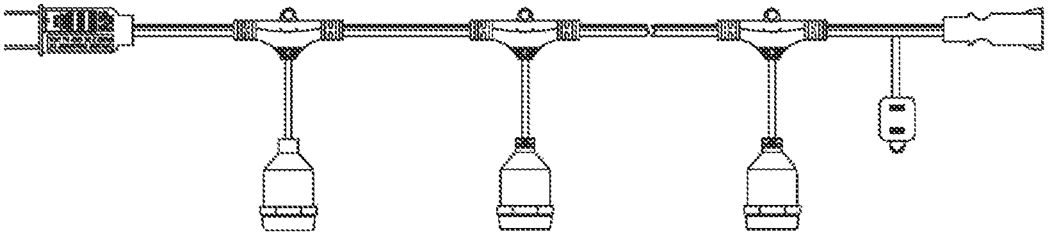
FIG. 1 is a schematic view of the appearance of a string light of a novel structure according to the present disclosure.

As shown in FIG. 1, a string light of a novel structure is provided. On a main wire, a plurality of string light bodies are connected in series, and a lamp holder 1 is a conical lamp holder with a thread. Each string light body includes the lamp holder 1 and a lamp cap 8, a bulb is installed in the lamp cap 8, and the lamp cap 8 is connected to the lamp holder 1. One end of each of two hanging wires 3 is connected to the lamp holder 1 in a riveting mode through double riveting ports 2, and the other ends of the two hanging wires 3 are connected to positive and negative electrodes of the main wire, respectively.

The lamp holder 1 is sleeved with a round internal frame 5. The inner side face of the round internal frame 5 is provided with an embedded guide groove 6 for riveting terminals of the two hanging wires 3 and the lamp holder 1 to pass through, facilitating installing of the round internal frame 5. The lower end of the round internal frame 5 is connected to the lamp holder 1, and the upper end of the round internal frame 5 is connected to the lamp cap 8. The lower end of the round internal frame 5 is provided with a serrated notch 4. The serrated notch 4 facilitates the complete flow of PVC adhesives around the lamp holder 1 and the round internal frame 5 during injection moulding, so that the adhesives of the lamp holder 1, the round internal frame 5 and the lamp cap are completely in contact with each other and fused, improving the solidity of the lamp holder 1 and preventing the lamp holder from loosening or falling off during the process of screwing in the bulb.

A waterproof ring 7 is disposed on the inner side of the opening portion of the lamp cap 8. The waterproof ring 7 is able to be in close press fit with a bulb shell of the bulb along with expansion of a lamp cap opening after the bulb is screwed in the lamp cap 8, preventing water drops from entering the inside of the lamp cap 8 and causing a short circuit, and improving the waterproof performance of the lamp cap.

A step is provided inside the lamp cap 8. A step plane plays a role in preventing the bulb from being screwed in excessively. After the bulb is screwed in place, the edge of the step plane is in contact with the bulb shell of the bulb, and an outward elastic force is exerted on the bulb shell simultaneously, preventing the bulb from being further screwed in, and preventing the bulb from being damaged by being screwed in energetically.

After a single lamp cap is connected to the main wire, a hooked wire dividing frame 10 is placed between the two hanging wires 3, preventing contact points of the two hanging wires 3 from being connected and short circuited. The exterior of the hooked wire dividing frame 10 is wrapped with a T-type connector 11.

The steps for installing the present disclosure are as follows.

1. After connecting the lamp holder 1 to the hanging wire 3, the round internal frame 5 is installed.
2. The lamp holder 1 provided with the round internal frame 5 is placed in a mold to be molded, and the single lamp cap 8 is obtained after molding.
3. The main wire is a double-core flat single-layer insulated main wire, or a double-layer insulated wire of a circular cross section; a connection terminal 9 with the hanging wire 3 is connected to the main wire by means of a copper strip or terminal.
4. At the connected position, the hooked wire dividing frame 10 is installed. The connection terminals 9 of the two hanging wires 3 are clamped to the fixed clamping positions of the hooked wire dividing frame 10 respectively, preventing a short circuit.
5. The T-type connector 11 is injection-molded at each connection point, and the connector is provided with a hanging hole or other structures.

The present disclosure is illustratively described above in conjunction with the accompanying drawings; obviously, the realization of the present disclosure is not limited by the above method; various improvements carried out on the method concept and technical solution of the present disclosure, or the concept and technical solution of the present disclosure being directly applied to other occasions without being improved are both within the scope of protection of the present disclosure.

What is claimed is:

1. A string light of a novel structure, on a main wire, a plurality of string light bodies being connected in series, each string light body comprising a lamp holder (1) and a lamp cap (8), a bulb being installed in the lamp cap (8), and the lamp cap (8) being connected to the lamp holder (1), wherein one end of each of two hanging wires (3) is connected to the lamp holder (1) in a riveting mode through double riveting ports (2), and the other ends of the two hanging wires (3) are connected to positive and negative electrodes of the main wire, respectively;

wherein the lamp holder (1) is sleeved with a round internal frame (5), the inner side face of the round internal frame (5) is provided with an embedded guide groove (6) for riveting terminals of the two hanging wires (3) and the lamp holder (1) to pass through, facilitating installing of the round internal frame (5), the lower end of the round internal frame (5) is connected to the lamp holder (1), and the upper end of the round internal frame (5) is connected to the lamp cap (8).

2. The string light of a novel structure according to claim 1, wherein the lower end of the round internal frame (5) is provided with a serrated notch (4), the serrated notch (4) facilitates the complete flow of PVC adhesives around the lamp holder (1) and the round internal frame (5) during injection moulding, so that the adhesives of the lamp holder (1), the round internal frame (5) and the lamp cap are completely in contact with each other and fused, improving the solidity of the lamp holder (1) and preventing the lamp holder from loosening or falling off during the process of screwing in the bulb.

3. The string light of a novel structure according to claim 2, wherein a waterproof ring (7) is disposed on the inner side of the opening portion of the lamp cap (8), the waterproof-ring (7) is able to be in close press fit with a bulb shell of the bulb along with expansion of a lamp cap opening after the bulb is screwed in the lamp cap (8), preventing water drops from entering the inside of the lamp cap (8) and causing a short circuit, and improving the waterproof performance of the lamp cap.

4. The string light of a novel structure according to claim 3, wherein a step is provided inside the lamp cap (8), a step plane plays a role in preventing the bulb from being screwed in excessively, after the bulb is screwed in place, the edge of the step plane is in contact with the bulb shell of the bulb, and an outward elastic force is exerted on the bulb shell simultaneously, preventing the bulb from being further screwed in, and preventing the bulb from being damaged by being screwing in energetically.

5. The string light of a novel structure according to claim 4, wherein the lamp holder (1) is a conical lamp holder with a thread.

6. The string light of a novel structure according to claim 5, wherein after a single lamp cap is connected to the main wire, a hooked wire dividing frame (10) is placed between the two hanging wires (3), preventing contact points of the two hanging wires (3) from being connected and short circuited; and the exterior of the hooked wire dividing frame (10) is wrapped with a T-type connector (11).

* * * * *